United States Patent [19]
Cartier

[11] 3,803,365
[45] Apr. 9, 1974

[54] CREEP CELL, IN PARTICULAR FOR NUCLEAR REACTORS
[75] Inventor: Louis Cartier, La Tronche, France
[73] Assignee: Commissariat a l'Energie Atomique, Paris, France
[22] Filed: May 28, 1971
[21] Appl. No.: 147,898

[30] Foreign Application Priority Data
May 29, 1970 France.......................... 70.19829

[52] U.S. Cl.................................. 176/19 R, 73/156
[51] Int. Cl............................................ G21c 17/10
[58] Field of Search..................... 176/19 R; 73/15.6

[56] References Cited
UNITED STATES PATENTS
3,392,086  7/1968  Bret et al.......................... 176/19 R
3,521,477  7/1970  Dollet.................................. 73/15.6

Primary Examiner—Reuben Epstein

[57] ABSTRACT

A creep cell for studying time-dependent deformations of a test-piece as a function of applied tractive force and irradiation. The creep cell comprises within a leak-tight enclosure a cylindrical test-piece provided at one end with a stationarily fixed disc and at the other end with a movable disc associated with a first piston, a reference test-piece rigidly fixed to a second piston, means for applying a known and variable pressure $P_e$ to the first piston so as to induce a stress in the test-piece, means for applying a known and variable pressure $P_r$ to the second piston so as to permit comparative measurement of the deformations of the two test-pieces and a microwave resonant cavity for measuring the displacement of the second piston.

4 Claims, 1 Drawing Figure

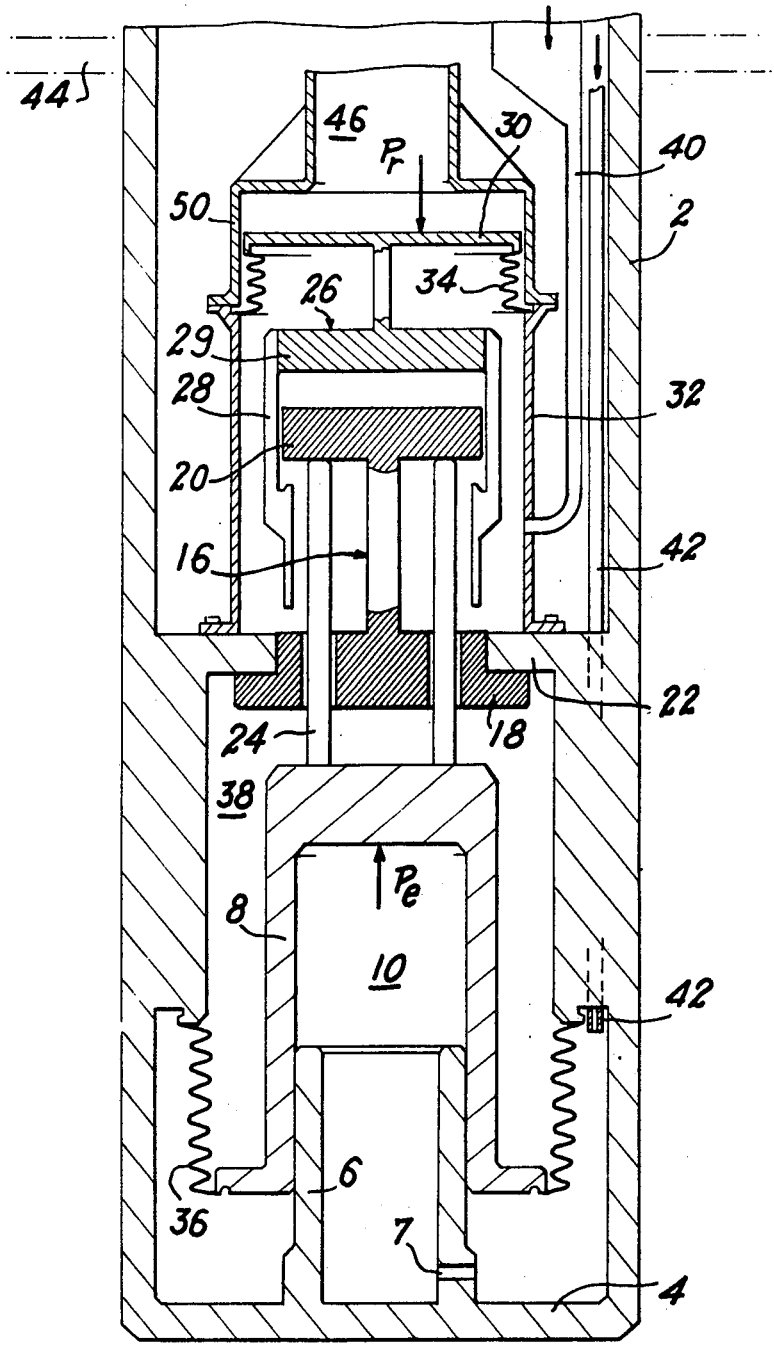

CREEP CELL, IN PARTICULAR FOR NUCLEAR REACTORS

This invention relates to a creep cell which is primarily intended for use in nuclear reactors for studying time-dependent deformations of a test-piece as a function on the one hand of the tractive force applied to said test-piece and on the other hand of the irradiation level.

In creep cells of known type, the load is applied by means of a pneumatic jack system comprising a bellows element and an extensometer which serves to take a continuous measurement of the deformations exhibited by the test-piece. In one particular type of creep cell which is at present in use, a metallic membrane which forms a bellows element is housed within a hermetically sealed tubular container. The admission of a gas under pressure into said tubular container produces a pressure difference between the interior of the bellows element and the space which is formed between said element and the wall of the tubular container. The effect of said pressure difference is to compress the bellows element and thus to apply a force to the test-piece and this latter in turn produces action on a rod which is rigidly fixed to the extensometer. The design function of said extensometer is to carry out a continuous measurement of the deformations sustained by a test-piece which is formed, for example, of structural materials or of fuel.

Measurements of creep within the interior of a nuclear reactor must essentially be remote controlled and this evidently gives rise to difficulties since remote control is liable to impair the accuracy of measurements. Further difficulties arise from the fact that it is necessary to maintain the test-piece under a constant given stress which must not be affected by the temperature variations of the surrounding medium.

The chief disadvantage of creep cells of the prior art lies in the common arrangement of the mechanical parts which serve to load the cell and the components which are employed for measurement since loading causes elastic deformations and creep of the measurement references.

This invention proposes a device which corresponds to practical requirements more effectively than comparable devices of the prior art, particularly insofar as said device is not subject to the disadvantages noted in the foregoing.

More specifically, this invention relates to a creep cell which is primarily intended for use in nuclear reactors in order to study time-dependent deformations of a test-piece as a function on the one hand of the tractive force applied to said test-piece and on the other hand of irradiation, wherein said creep cell comprises within a substantially tubular leak-tight enclosure a first piston located in proximity to one end of said enclosure, a test-piece having the shape of a cylinder which terminates at the top and bottom extremities respectively in an upper and lower disc which are larger in diameter than said cylinder, said lower disc being pierced by at least two bores and secured to the internal wall of said enclosure, at least two metallic members adapted to slide within said bores and rigidly fixed on the one hand at one end thereof to said first piston and on the other hand at the other end thereof to said upper disc, a reference test-piece rigidly fixed to a second piston and located in the vicinity of the first test-piece, one end of said reference test-piece being capable of bearing on said lower disc and the other end being capable of bearing on said upper disc, a measuring system comprising a microwave resonant cavity, means for applying a known and variable pressure $P_e$ to said first piston so as to induce a stress in the test-piece, means for applying a known and variable pressure $P_r$ to said second piston so as to permit comparative measurement of the deformations of the two test-pieces, means for employing the microwaves in order to measure the displacement of said second piston, dosimeters for determining the radiation dose received by said test-pieces and a system for regulating the temperature of said cell.

A better understanding of the invention will be obtained from the following description of one embodiment of the invention which is given by way of example without any limitation being implied. Reference will be made in the following description to the accompanying drawings in which the single FIGURE illustrates a creep cell in accordance with the invention, said cell being intended to be immersed in the tank of a nuclear reactor.

The creep cells in accordance with the invention contain two test-pieces formed of materials which may or may not be identical. The first test-piece is subjected to a tractive force and to a nuclear radiation flux whilst the second test-piece or so-called reference test-piece is subjected only to irradiation. A study of the deformations exhibited by the first test-piece makes it possible to determine the continuing or time-dependent elongation of said test-piece as a function of the tractive force applied to said test-piece and of the radiation received by this latter. A study of the deformation exhibited by the second test-piece or so-called reference test-piece serves to determine the elongation of said test-piece as a function of the irradiation level. By choosing identical materials for both test-pieces, it is thus possible to determine the influence of each of the two parameters, namely irradiation level and tractive force. The other test conditions such as temperature in particular are maintained constant.

The creep cell in accordance with the invention as illustrated in the single accompanying FIGURE comprises firstly a leak-tight enclosure 2 which has a substantially tubular shape and is closed at one extremity 4. A piston 8 is slidably mounted on a cylinder 6, the axis of which coincides with the axis of the enclosure. An opening 7 extends through the wall of the cylinder 6. Leak-tightness of the chamber 10 which is delimited by the interior of the first piston 8 and part of the enclosure 2 is ensured by means of a bellows seal 36. A test-piece 16 having by way of example the shape of a solid cylinder terminating at one end in a lower disc 18 and at the other end in a disc 20 is attached to the internal wall of the enclosure 2 by means of a flanged portion of the lower disc 18 which is applied against an annular shoulder 22 of the internal wall of the enclosure 2. The lower disc 18 provides a free passageway for metallic members 24 of the thrust system. One of the two ends of said metallic members 24 is rigidly fixed to the top portion of the first piston 8 whilst the other end is applied against the upper disc 20. A reference test-piece 26 consisting, for example, of a tube 28 or of rods is located in proximity to the test-piece 16. The length of the tube 28 is such that the base of this latter is capable of coming to rest in the bottom position on the lower disc 18 and of being applied in the top position against the underface of the disc 20. A tube 32 which is attached to the annular shoulder 22 by means of screws surrounds the two test-pieces 16 and 26. A movable assembly 29 is rigidly fixed on the one hand to the tube 28 and on the other hand to the base of a second piston 30. A bellows seal 34 is attached to one upper extremity of the tube 32 and to the base of the piston 30. The piston 30, the tube 32 and the internal wall of the enclosure 2, the bellows seals 34 and 36 and the first piston 8 delimit a chamber 38. The interior of said leak-tight chamber can be filled by means of the pipe 40 with a heat-transporting liquid such as liquid NaK. A pipe 42 serves to inject an inert gas under pressure through the opening 7 into the chamber 10 which is formed within the interior of the piston 8. The creep cell as hereinabove described can constitute the end portion of a tube, the closed extremity of said tube being formed by the wall of the enclosure 2. The creep cell is placed in proximity to a radiation source and can be immersed in the tank 44 of a nuclear reactor as in the example of construction which is described. The piston 30 and the member 50 which is rigidly fixed to the tube 32 form a microwave resonant cavity 46. Means which are not illustrated serve to apply a pressure $P_r$ to the piston 30; by way of example, said means can consist of an inert gas under pressure. The radiation dose received by the test-pieces 16 and 26 is determined by known means such as dosimeters. A temperature-regulating system (not shown) serves to maintain the temperature of the cell at ± 2°C.

The principle of operation of the creep cell as has just been described is as follows: a gas under pressure is introduced into the chamber 10 through the pipe 42 and the opening 7, thereby applying a pressure $P_e$ on the piston 8. Said pressure is transferred by means of the metallic members 24 to the upper disc 20 which constitutes the top of the test-piece 16. Said test-piece is held in position by means of the annular shoulder 22 and is therefore subjected to a tractive force, the value of which depends on the pressure $P_e$, on the useful area of the bellows seal 36 and on the pressure $P_c$ of the chamber 38. Said tractive force causes elongation as a result of elasticity and of creep of the test-piece 16 as a function of time. By varying the pressure $P_r$ while the pressure $P_c$ of the chamber 38 remains constant, the movable assembly 29 which drives the piston 30 is capable of displacement in both directions. When the reference test-piece 26 is in contact with the disc 20, the elongations sustained by the test-piece 16 result in an identical displacement of the piston 30. The displacement of said piston is determined with precision by a known method which consists in determining the variations in resonant frequency of the microwave resonant cavity 46. The creep curve representing the elongation of the test-piece 16 as a function of time can thus be continuously plotted.

In order to improve the degree of accuracy obtained, the length of the test-piece 16 is compared directly with the length of the reference test-piece 26 which is only subjected to nuclear radiation. To this end, the pressure $P_r$ is increased so that the lower end of the reference test-piece 26 is in contact with the disc 18. The displacement which is recorded during this operation corresponds to the difference in length between the two test-pieces.

When the two test-pieces 16 and 26 are formed of the same material, it is thus possible to determine the deformations of said material in time as a function on the one hand of the tractive force and on the other hand of the irradiation level.

The creep cell which is illustrated diagrammatically in the FIGURE has been advantageously employed in studies relating to creep in cladding materials for nuclear reactors in high flux values (of the order of 20 W/gr).

The test-piece 16 had a useful cross-sectional area of 2 mm$^2$ and a useful length of 40 mm. The temperature of the cell was maintained at ± 2°C within a range of 500° to 800°C. The pressure $P_e$ was lower than or equal to 70 bars. The accuracy of the measuring system which made use of the microwave resonant cavity 46 was to within less than $2 \times 10^{-3}$ mm and the maximum measurable elongation was equal to 10 mm.

What we claim is:

1. A creep cell which is primarily intended for use in nuclear reactors in order to study time-dependent deformations of a test-piece as a function on the one hand of the tractive force applied to said test-piece and on the other hand of irradiation, wherein said creep cell comprises within a substantially tubular leak-tight enclosure a first piston located in proximity to one end of said enclosure, a test-piece having the shape of a cylinder which terminates at the top and bottom extremities respectively in an upper and lower disc which are larger in diameter than said cylinder, said lower disc being pierced by at least two bores and secured to the internal wall of said enclosure, at least two metallic members adapted to slide within said bores and rigidly fixed on the one hand at one end thereof to said first piston and on the other hand at the other end thereof to said upper disc, a reference test-piece rigidly fixed to a second piston and located in the vicinity of the first test-piece, one end of said reference test-piece being capable of bearing on said lower disc and the other end being capable of bearing on said upper disc, a measuring system comprising a microwave resonant cavity, means for applying a known and variable pressure $P_e$ to said first piston so as to induce a stress in the test-piece, means for applying a known and variable pressure $P_r$ to said second piston so as to permit comparative measurement of the deformations of the two test-pieces, means for employing the microwaves in order to measure the displacement of said second piston, dosimeters for determining the radiation dose received by said test-pieces and a system for regulating the temperature of said cell.

2. A creep cell in accordance with claim 1, wherein said enclosure contains a heat-transporting liquid.

3. A creep cell in accordance with claim 1, wherein part of the walls of said enclosure is formed by a metallic membrane in the form of a bellows seal.

4. A creep cell in accordance with claim 1, wherein said cell is placed within the tank of a nuclear reactor.

* * * * *